US008830896B2

(12) United States Patent
Shinozaki

(10) Patent No.: US 8,830,896 B2
(45) Date of Patent: Sep. 9, 2014

(54) PACKET RELAY METHOD AND DEVICE

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 12/645,698

(22) Filed: Dec. 23, 2009

(65) Prior Publication Data
US 2010/0097979 A1 Apr. 22, 2010

Related U.S. Application Data

(63) Continuation of application No. PCT/JP2007/063165, filed on Jun. 29, 2007.

(51) Int. Cl.
  H04B 7/14    (2006.01)
  H04L 12/825  (2013.01)
  H04L 1/00    (2006.01)
  H04L 12/823  (2013.01)
  H04L 12/801  (2013.01)
  H04W 28/12   (2009.01)

(52) U.S. Cl.
  CPC .............. H04L 1/0026 (2013.01); H04L 47/26 (2013.01); H04L 1/0028 (2013.01); H04L 47/32 (2013.01); H04L 47/12 (2013.01); H04L 47/14 (2013.01); H04L 2001/0097 (2013.01); H04W 28/12 (2013.01)
  USPC ........... 370/315; 370/230; 370/232; 370/236; 455/436; 455/522

(58) Field of Classification Search
  CPC ....................................................... H04B 7/14
  USPC .......................................................... 370/315
  See application file for complete search history.

(56) References Cited

U.S. PATENT DOCUMENTS 5,710,981 A * 1/1998 Kim et al. ............... 455/69
6,445,679 B1 * 9/2002 Taniguchi et al. .......... 370/232
(Continued)

FOREIGN PATENT DOCUMENTS

EP    2161888 A1    3/2010
JP    11341063      12/1999
(Continued)

OTHER PUBLICATIONS

International Search Report dated Jul. 24, 2007, from the corresponding International Application.
(Continued)

*Primary Examiner* — Ayaz Sheikh
*Assistant Examiner* — Hai-Chang Hsiung
(74) *Attorney, Agent, or Firm* — Smith, Gambrell & Russell, LLP

(57) ABSTRACT

Feedback information including a transmission quality of a packet transmitted from a transmitting device to a receiving device is received from the receiving device and the transmission quality included in the feedback information is revised down, to be transferred to the transmitting device, based on information of resource consumed for maintaining a wireless link included in a path to the receiving device. The above revising down is executed if it is found that the information of resource consumed reaches a predetermined threshold or is not executed unless it is found otherwise. The information of resource includes, for example, the number of retransmission times of a packet for a predetermined period of time, a transmission power level or a code length of an error correcting code.

9 Claims, 13 Drawing Sheets

(56) References Cited

U.S. PATENT DOCUMENTS

| | | | |
|---|---|---|---|
| 2002/0015528 A1* | 2/2002 | Kondo et al. | 382/224 |
| 2003/0018794 A1 | 1/2003 | Zhang et al. | |
| 2004/0156315 A1* | 8/2004 | Walls et al. | 370/235 |
| 2004/0229570 A1* | 11/2004 | Matsumura | 455/67.11 |
| 2005/0143115 A1* | 6/2005 | Hiddink et al. | 455/522 |
| 2006/0240826 A1* | 10/2006 | Shinozaki | 455/436 |
| 2006/0246938 A1* | 11/2006 | Hulkkonen et al. | 455/522 |
| 2007/0064604 A1* | 3/2007 | Chen et al. | 370/230 |
| 2008/0025269 A1* | 1/2008 | Gupta et al. | 370/338 |

FOREIGN PATENT DOCUMENTS

| | | |
|---|---|---|
| JP | 2001345807 | 12/2001 |
| JP | 2002325095 | 11/2002 |
| JP | 2004140674 | 5/2004 |

OTHER PUBLICATIONS

Extended European Search Report dated Jun. 28, 2013 received in Application No. 07767949.6.

* cited by examiner

FIG.6

| V=2 | P | RC | PT=SR=201 | PACKET LENGTH |
|---|---|---|---|---|
| SOURCE SSRC IDENTIFIER |||||

(REPORT BLOCK NUMBER #n)

| SSRC IDENTIFIER #n ||
|---|---|
| INSTANTANEOUS DISCARD RATE | CUMULATIVE DISCARDED PACKET NUMBER |
| MAXIMUM SEQUENCE NUMBER ||
| JITTER DELAY ||
| NTP TIME STAMP WHEN LAST SR OF SSRC#n IS RECEIVED (LSR) ||
| DELAY FROM LSR UP TO NOW (DLSR) ||

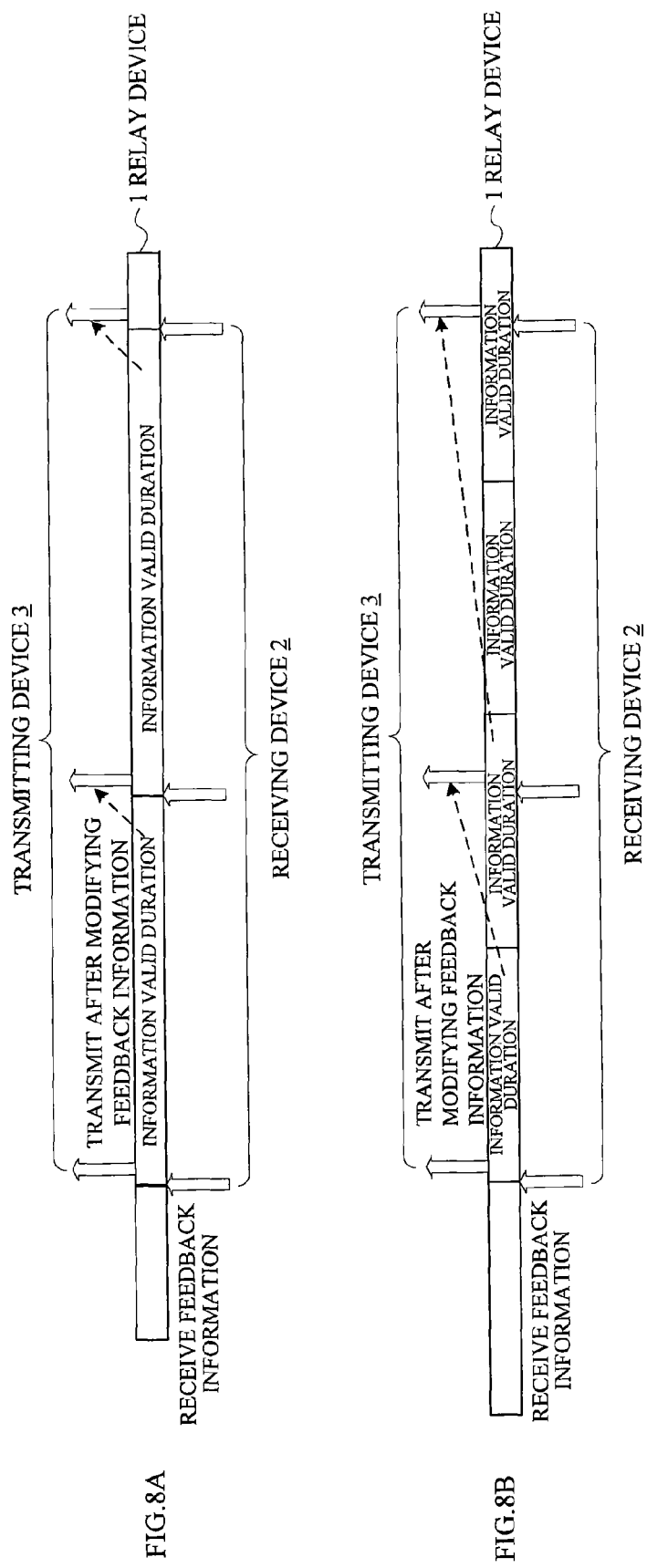

PACKET RELAY METHOD AND DEVICE

CROSS-REFERENCE TO RELATED APPLICATION

This application is a continuation of International Application PCT/JP2007/63165 filed on Jun. 29, 2007, the contents of which are herein wholly incorporated by reference.

FIELD

The present invention relates to a packet relay method and device, which are preferably applied to a relay method and device of a real-time type packet in a wireless (radio) network.

BACKGROUND

As a typical wireless network system, a wireless LAN (IEEE 802.11) system depicted in FIG. 11 or a cellular (3GPP) system depicted in FIG. 12 is known, in which a situation of a real-time type streaming service being utilized through such a wireless network has recently increased.

In a multi-media service, especially a video service, by taking account of a load to a network for the distribution thereof over the Internet or the like and enormous amounts of video data pressing a storage area, a video file is compression encoded as needed in order to avoid them. This is represented by e.g. MPEG1 and 2.

Also, H.263 for 3G mobile phone encoding and H.264 for changing a compression rate in a wideband from QCIF level to HD level have been proposed as a new encoding method, unified with AVC that is MPEG-4 part 10 and standardized as H.264/AVC.

As streaming data, there exist the ones allowing temporary buffering like on-demand video program distribution besides the ones requiring a real-time reproduction like a live telecast or a video teleconference. Namely, there exist streaming data reproduced after having been buffered to some extent with respect to a reproduction timing on a timeline and streaming data not necessarily forced to carry all data transmitted from a media server to a receiving device upon the reproduction like a TV program.

It is to be noted that, as a reference, there is a simultaneous report communication system and method performing feedback of the statistical information, in which each relay node is provided with an information input means obtaining information reception status data delivered from receiving terminals connected or a subsidiary relay node to an up line, a statistical processing means generating statistical information of the receiving status of the receiving terminals connected by counting receiving status data according to the predetermined rules and a statistical information output means periodically delivering statistical information generated to an upper relay node or a transmitting device (see e.g. Japanese Laid-open Patent Publication No. 2001-345807).

Also, as another reference, there is a streaming communication system and a stream transfer control method adjusting transfer data amount to reach a specified transmission rate, in which a QoS control portion in a reception node calculates QoS parameters respectively representing transmission rates allowing a real-time transfer in a transmission node and a relay node based on a data receiving performance and a data processing performance notified by the relay node and the reception node itself as well as the current transmission rate to require a setting change to the corresponding parameters; the transmission node and the relay node, after having sent a message temporarily aborting a QoS control to the transmission node, reduce stepwise a transmission allowable priority while increasing stepwise a transmission allowable block number of data block of the same priority as the priority in the same cycle to transmit or discard each data block (see e.g. Japanese Laid-open Patent Publication No. 11-341063).

SUMMARY

The above system is designed supposing high quality media as transmission media but not designed supposing media in an environment with severe condition for ensuring a transmission quality for a wireless system. Therefore, an influence to services due to a wireless quality becomes a problem.

Generally, a wireless environment varies momentarily and so is not fixed due to fadings, multipaths, interferences between channels, interferences between systems and movements of terminals or the like. In order to avoid such a problem, there exist technologies for error concealment and error recovery processing for encoding errors caused due to a wireless transmission quality deterioration with technologies such as a power control, Rake reception, channel orthogonalization, transmission diversity and soft hand-over and with technologies such as interleave or FEC (Forward Error Collection) between a wireless base station and terminals.

However, even if those technologies are used, all of the errors can not be removed, where for example burst errors disabling effects of interleave etc. occur due to a link disconnection between the base station and the terminals based on a hard hand-over and a severe fading.

It arises from temporal environment changes of a wireless transmission path and contiguous environment changes of a wireless transmission path, i.e. state changes of a terminal, in which it arises from a change of a positional relationship between a terminal and a service offering area (called a cell in case of a cellular system especially depicted in FIG. 12) in response when the terminal begins to move from its stopped state or a change occurs in the moving speed. Namely, the transmittable speed is generally differed with an increase of an error rate (a packet discard rate or a discarded packet number etc.) depending on a case where the terminal lies at a cell edge or in vicinity of a base station, so that the transmission speed at the cell edge is lower than that in the vicinity of the base station with an increase of a transmission error rate.

A media reproduction side (receiving device) has generally a means for sending feedback information having stored therein packet discard rate and discarded packet number etc. to a transmitting device with an RTCP reception report packet (see FIG. 6), thereby reporting the reception status of the receiving device. Therefore, the transmitting device can, as depicted in FIG. 13, perform reducing the transmission speed (throughput) of transmission data as a transmission ability according to the error rate, such as modifying a quantization parameter in video compression.

However, the above feedback information includes as an object a transmission quality obtained as a result of error correction in a wireless section, so that an error state ERR as depicted by diagonal lines in FIG. 13 occurs in the transmitting device because there is no way of knowing a communication environment, particularly a change of the wireless link and no control of the transmission speed is made until the error correcting ability reaches the limit value.

Namely, although the transmitting device can acquire error rate information of the packet discard rate etc. in the receiving device from feedback information, the transmitting device can not know how much degree of contribution (a change to an intensive error correcting method or a plural number of retransmission processes etc.) the relay device makes for maintaining the packet discard rate or the like.

Accordingly, despite that the transmission ability of the relay device is going to reach its limit, the transmitting device determines that the transmission quality of the receiving device is still good, failing to control downward the transmission speed, so that the transmitting device is to reduce the transmission speed only after the transmission ability of the relay device is exceeded (error state ERR).

Such a change of situation is serious for video transmission, so that when referencing pictures of video streamed especially with a compression technology, the picture images can not be reproduced because of lack of the referenced frame, thereby appearing as a visually-unbearable quality.

Namely, in excess of the control limit by transmission quality maintenance of the wireless network, upper application such as multimedia streaming data will be affected with errors. Recently, the above problem is becoming remarkable since the use of the video distribution service in the wireless environment is increasing.

In order to achieve the above-mentioned object, a packet relay method and device in one aspect of the present invention receives feedback information, from a receiving device, including a transmission quality of a packet transmitted from a transmitting device to the receiving device and revises down the above transmission quality included in the feedback information, to be transferred to the transmitting device, based on information of resource consumed for maintaining a wireless link included in a transmission path to the receiving device.

BRIEF DESCRIPTION OF DRAWINGS

FIG. 6 is a chart depicting a received report (RTCP-RR) by RTCP protocol used in the present invention;

FIGS. 8A and 8B are time charts depicting an update timing of feedback information according to the present invention;

DESCRIPTION OF EMBODIMENTS

Figure 1:
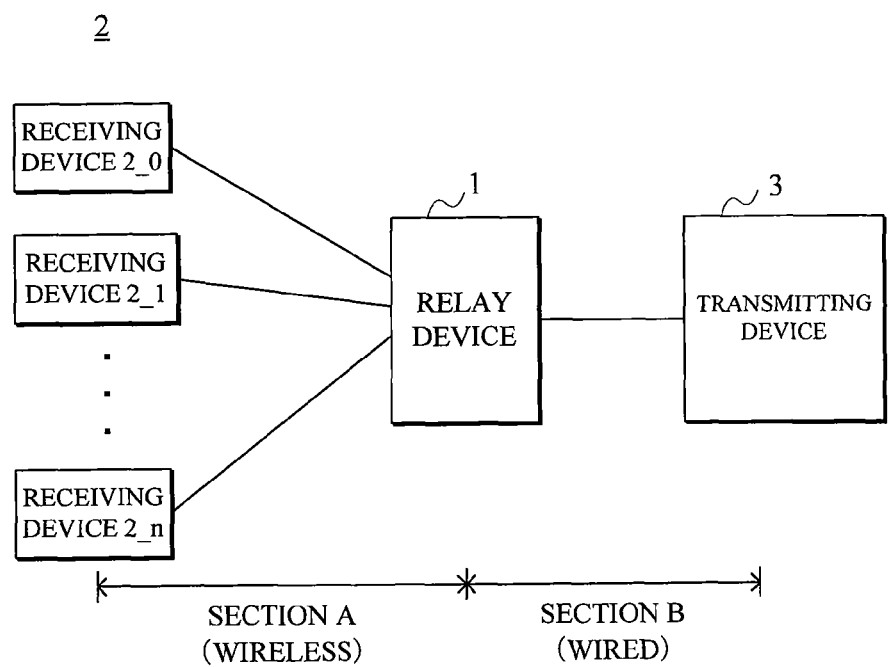
FIG. 1 is a block diagram depicting a schematic network arrangement to which a packet relay method and device according to the present invention is applied.

One embodiment of a network arrangement is depicted in FIG. 1, which includes a relay device 1, receiving devices 2_0-2_n of "n" number represented by a receiving device 2 and a transmitting device 3 communicating with the receiving device 2 through the relay device 1. Section A has a feature that the transmission quality is easily varied with time in comparison with section B. For example, the section A corresponds to a wireless section, where a transmittable bandwidth or the like may largely vary with time.

In such a network environment, upon handling a real-time type transmission, particularly a video stream transmission with feedback information, when an error correction processing in the transmission path such as a retransmission processing is performed more than a fixed number of times as the transmission environment varies, the transmission quality reported in the feedback information (packet discard rate or discarded packet number etc.) is reported as a transmission quality lower (worse) than a transmission quality maintained to a transmission source of the video stream. Namely, it is transmitted after revising down (modifying the effect component) the feedback information transmitted to the transmitting device 3 from the receiving device 2, based on the information of resource (resource information) consumed for maintaining the transmission quality of the section A between the relay device 1 and the receiving device 2.

Figure 2:
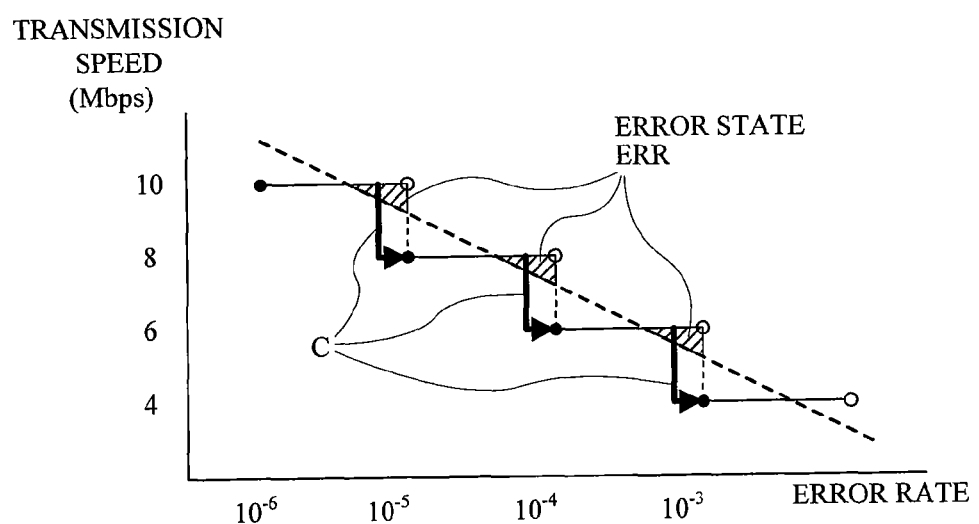
FIG. 2 is a graph chart depicting a concept of the packet relay method and device according to the present invention.

As a result, as depicted by heavy lines C in FIG. 2, when a threshold, which may be below the limit value, corresponding to the limit value of an error correcting ability or a transmission quality maintaining ability of the wireless network at a certain transmission speed is reached, the transmission data is prevented from being excessively accumulated or a wireless resource corresponding to a band for lower speed is allowed to be used in the relay device by slowing, in good time, (e.g. reducing an encoding rate) the transmission speed in the transmitting device 3 of multimedia server.

Figure 3:
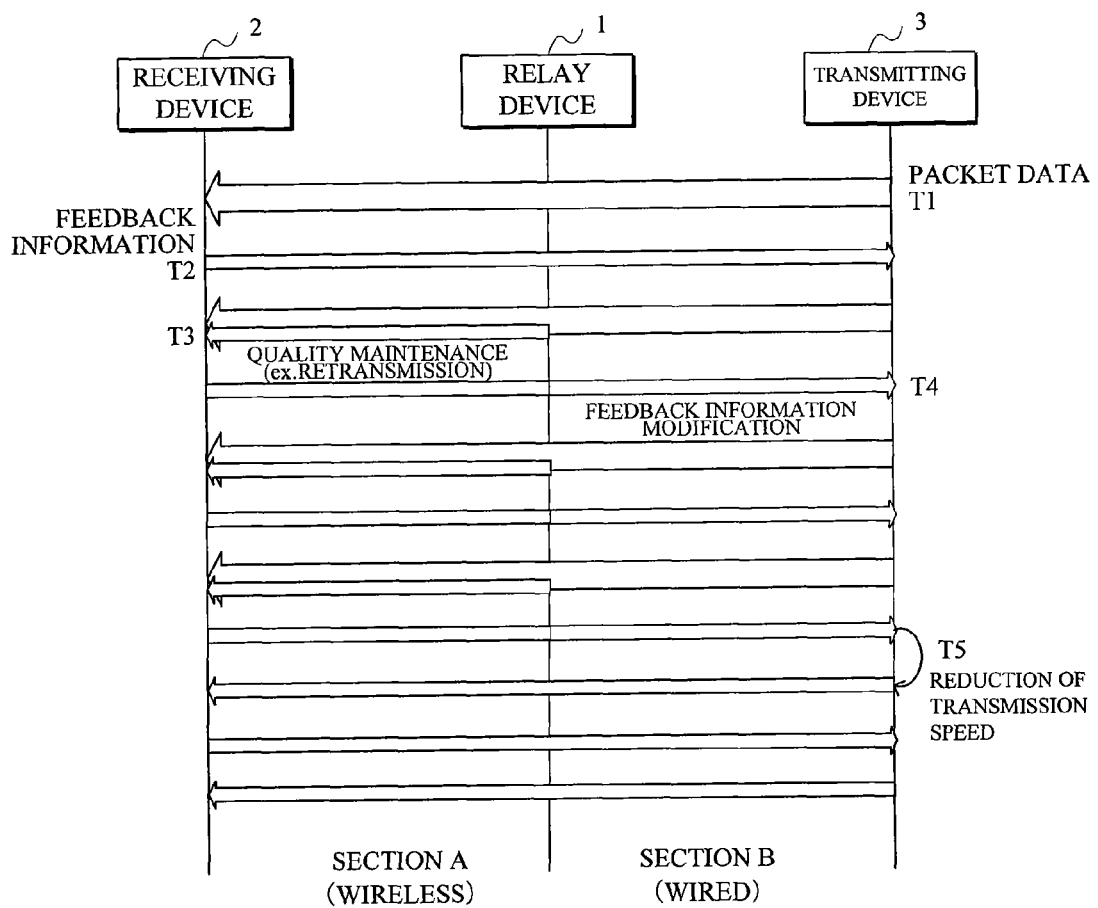
FIG. 3 is a sequence diagram depicting a basic operation of the present invention.

This will be described with reference to a sequence in FIG. 3, in which when a packet transmitted from the transmitting device 3 is relayed by the relay device 1 and received by the receiving device 2 (step T1), the relay device 1 relays the feedback information for constantly reporting the transmission quality from the receiving device or transfers it to the transmitting device 3 (step T2). With a quality variation, e.g. a quality deterioration of the transmission path in this section A, the relay device 1 performs retransmitting the packet, providing redundancy (enhancement) of error correcting codes or increasing a power level if the transmission section A is a wireless section, as necessary, whereby the relay device 1 performs a quality assurance control (step T3) (for example, control of the error rate equal to or below a predetermined value) maintained as much as possible between the relay device 1 and the receiving device 2.

In the relay device 1, the feedback information is modified or corrected (step T4) based on information of resource consumed for maintaining the wireless link included in the transmission path to the receiving device 2. For example, if it is determined that an ability more than a fixed threshold (a limit value or less than the limit value) is exercised, a parameter is generated for modifying the feedback information based on the information of resource consumed for maintaining the wireless link such as the number of retransmission times for a predetermined time interval, a transmission power level and a code length of an error correcting code, thereby modifying the feedback information with the parameter.

While the receiving device 2 thus reports the feedback information based on the transmission quality maintained by an error protective control in the relay device 1, the relay device 1 rewrites the feedback information to a value discounted by an error protection amount performed by the relay device 1, i.e. revises down the transmission quality included in the feedback information. By reporting this to the transmitting device 3, the transmitting device 3 determines that some of the packet data transmitted do not have reached the receiving device 2, reducing the transmission speed (step T5), for example by reducing the encoding rate.

When the above transmission quality maintaining ability is the number of retransmission times of a packet for a predetermined time interval and the above feedback information is modified, a value given by subtracting a threshold from a discarded packet number corresponding to the number of retransmission times of the packet to the receiving device for the predetermined time interval or from a packet discard rate indicating a value given by dividing the discarded packet number by the number of transmission times of the packet may be added respectively to the discarded packet number or the packet discard rate indicating the transmission quality stored in the feedback information.

Also, when the above transmission quality maintaining ability is the transmission power level for a predetermined time interval, a value given by subtracting a threshold from the packet discard rate determined based on a ratio of a period during which the transmission power level exceeds a predetermined power level over the predetermined time interval or from the discarded packet number based on the packet discard rate may be added respectively to the packet discard rate or the discarded packet number as the transmission quality included in the feedback information.

Furthermore, when the above transmission quality maintaining ability is a code length of the error correcting code for the predetermined time interval, a value given by subtracting a threshold from the packet discard rate determined based on the code length of the error correcting code or from the discarded packet number may be added respectively to the packet discard rate or the discarded packet number as the transmission quality included in the feedback information.

Embodiment

FIGS. 4-6

Figure 4:
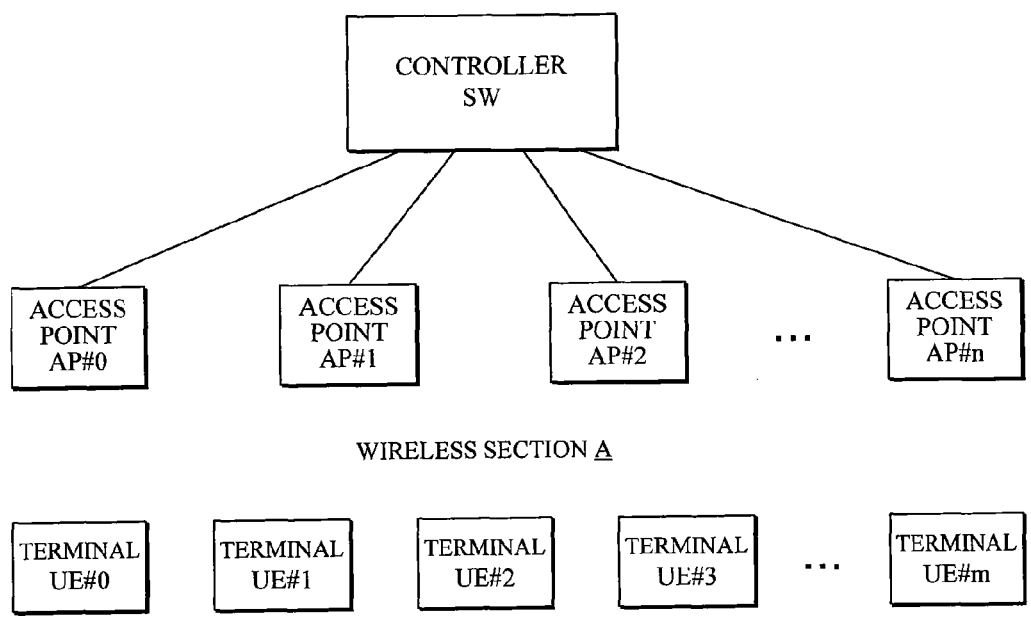
FIG. 4 is a block diagram depicting a network arrangement in an embodiment of the packet relay method and device according to the present invention.
Figure 11:
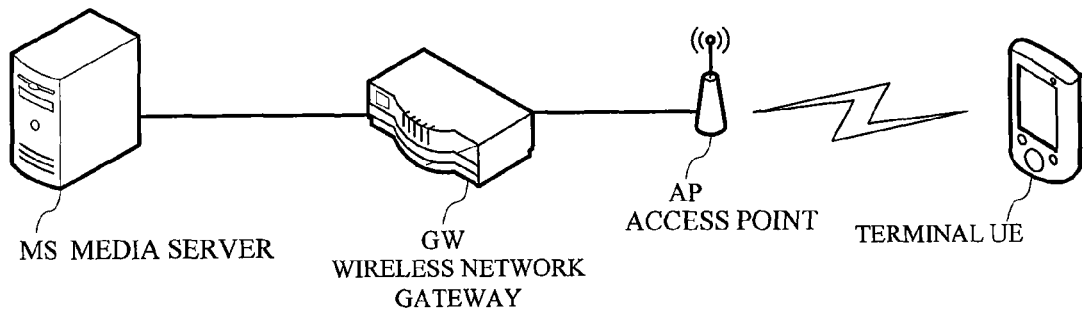
FIG. 11 is a diagram depicting an arrangement of a general wireless transmission LAN system.
Figure 12:
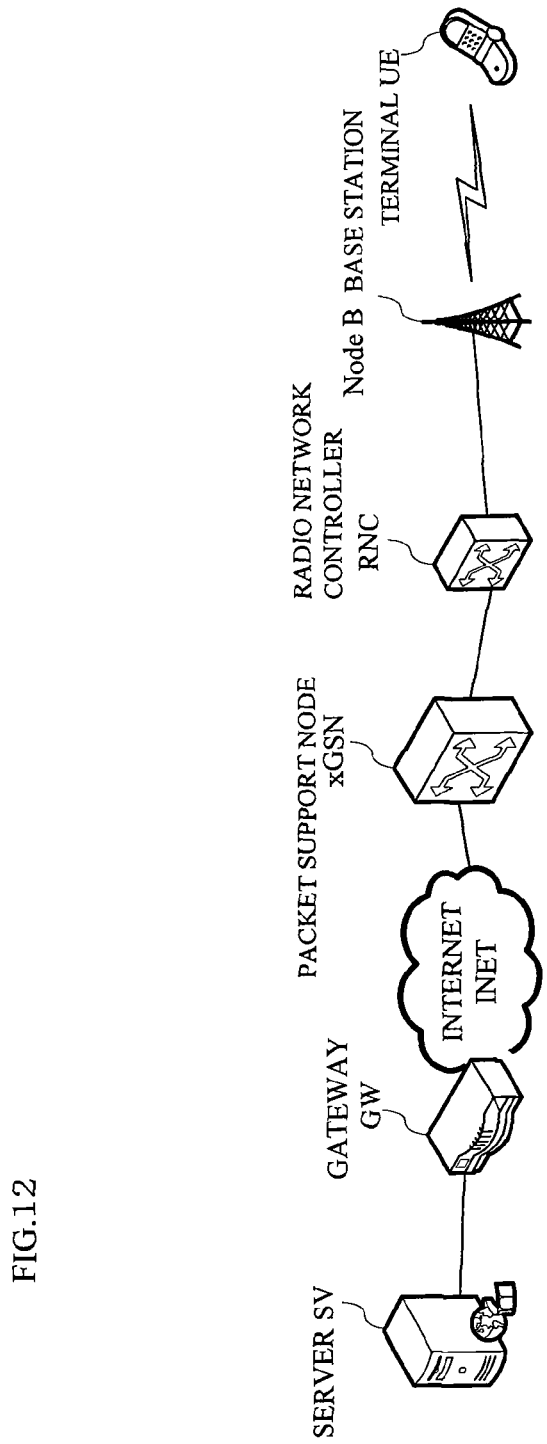
FIG. 12 is a diagram depicting an arrangement of a general cellular (3GPP) system.
Figure 13:
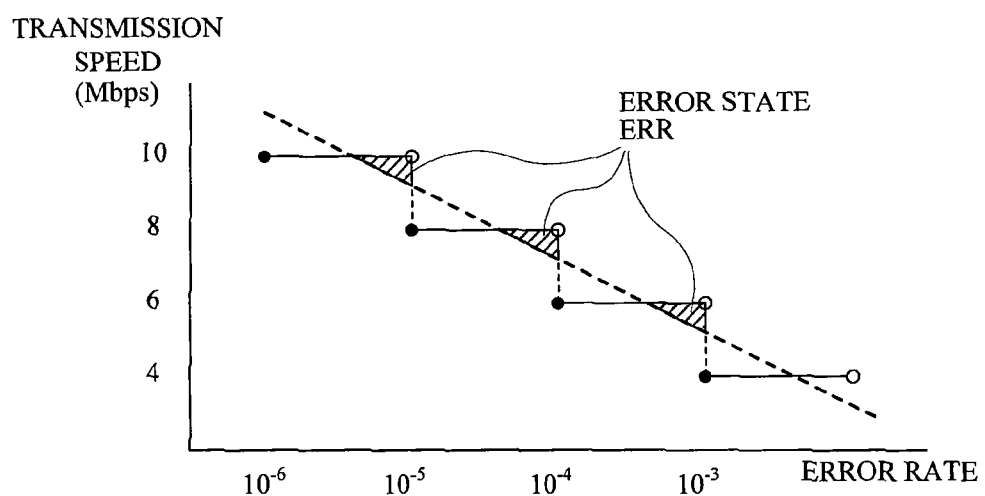
FIG. 13 is a graph chart depicting a relationship between a transmission ability of a transmitting network and error rate.

FIG. 4 depicts an embodiment of a packet relay method and device according to the present invention for a wireless network, especially a wireless LAN system as depicted in FIG. 11. The wireless LAN system includes a plurality of access points AP#0-AP#n (hereinafter, occasionally represented by AP), a controller SW controlling the access points AP and terminals UE#0-UE#m (hereinafter, occasionally represented by UE). The controller SW and the access points AP compose the relay device 1 depicted in FIG. 1, wherein the section A between the access points AP and the terminals UE corresponding to the receiving device 2 depicted in FIG. 1 is supposed to be a wireless link as with FIG. 1.

The controller SW has mounted therein "MANE: Media Aware Network Element" described in e.g. RFC3984. MANE is a network element such as a middle box or an application layer gateway (see FIG. 11) for parsing a part of an RTP payload header or an RTP payload thereby to react the contents of media.

A packet to the terminals UE is transmitted from the controller SW to the access points AP subjecting the terminals UE. When the controller SW receives the packet to the terminal e.g. UE#0 from the transmitting device 3 (not depicted.), the controller SW transmits it to the terminal UE#0 through the access point AP#0.

Figure 5:
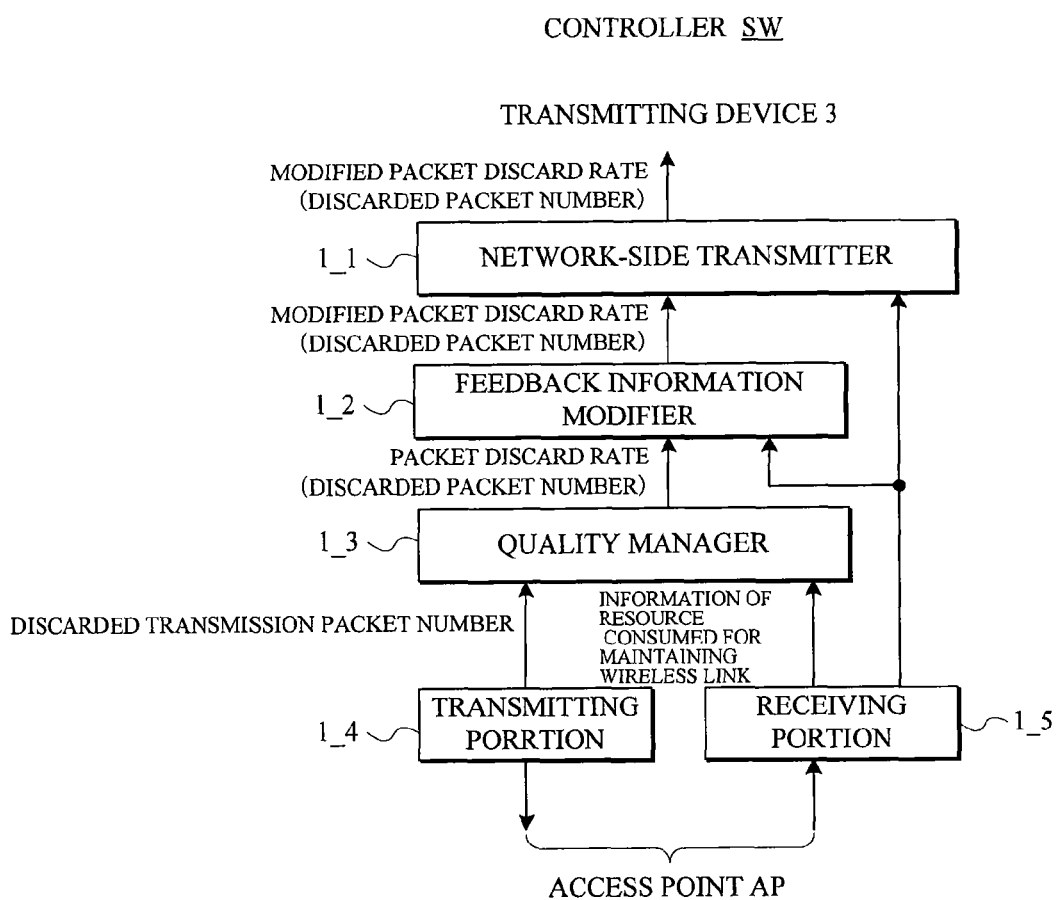
FIG. 5 is a block diagram depicting an arrangement of a controller SW of the present invention.

Here, the information of resource consumed for maintaining the wireless link between the access point AP#0—the terminal UE#0 (maintaining the wireless link not to be disconnected, maintaining the error rate in the wireless link below a predetermined value and the like) is reported to the controller SW. For example, the information of resource consumed for maintaining the wireless link is power control information, retransmission information in such a case where a retransmission control is performed between the access points AP—the terminals UE or code length information of an error correcting code when using an error correcting code process such as turbo coding. These information are information relating to a resource that the access points are consuming for maintaining the wireless link in the wireless link between the access point AP#0—the terminal UE#0, in which a power value increased as the receiving level is decreased at the terminal, the number of retransmission (e.g. retransmission control by HARQ) times due to reception failures at the terminals and information regarding how long the code length is elongated when encoding with turbo codes are cited as an examples. In this embodiment, the controller SW is composed, as depicted in FIG. 5, of a network-side transmitter 1_1, a feedback information modifier 1_2, a quality manager 1_3, a transmitting portion 1_4 and a receiving portion 1_5, wherein each portion provides the following functions:

The network-side transmitter 1_1 transmits to the network side the feedback information received from the feedback information modifier 1_2, for example a reception report (RTCP-RR) (packet discard rate or discarded packet number) depicted in FIG. 6, notified by RTCP (Realtime Transfer Control Protocol) which is a protocol used as control information upon communications with e.g. real time data. This reception report has been edited as necessary by the feedback information modifier 1_2.

In the feedback information modifier 1_2, the feedback information received from the receiving portion 1_5 is modified as necessary based on the information of resource consumed for maintaining the wireless link received from the quality manager 1_3 and transfers the feedback information modified to the network-side transmitter 1_1.

In the quality manager 1_3, from the information of resource consumed for maintaining the wireless link received from the receiving portion 1_5, such as the number of retransmission times performed in the access points AP, the power control information or the code length information of error correcting code, information to be reported to the feedback information modifier 1_2 is generated. For example, the packet number to be retransmitted, a retransmission success rate or the transmitted packet number in a transmission power section for which a specific threshold is exceeded is converted into a value available in the feedback information modifier 1_2. For example, when the discarded packet number or the packet discard rate with the RTCP reception report (RTCP-PR) as depicted in FIG. 6 is used as the feedback information, a value reported by the quality manager 1_3 is a value (this may be a value to be modified) of error rate etc. of the discarded packet number, the packet discard rate or the like.

In the receiving portion 1_5, with transmission quality maintaining ability information received from the access points AP being reported to the quality manager 1_3, data to be transferred to the network-side transmitter 1_1 if any are transferred, and the feedback information or the reception report is transferred to the feedback information modifier 1_2.

In the transmitting portion 1_4, the packet transmitted number is notified to the quality manager 1_3. The packet number information transmitted may be or may not be used for the above conversion in the quality manager.

Overall Operations

FIG. 7

Figure 7:
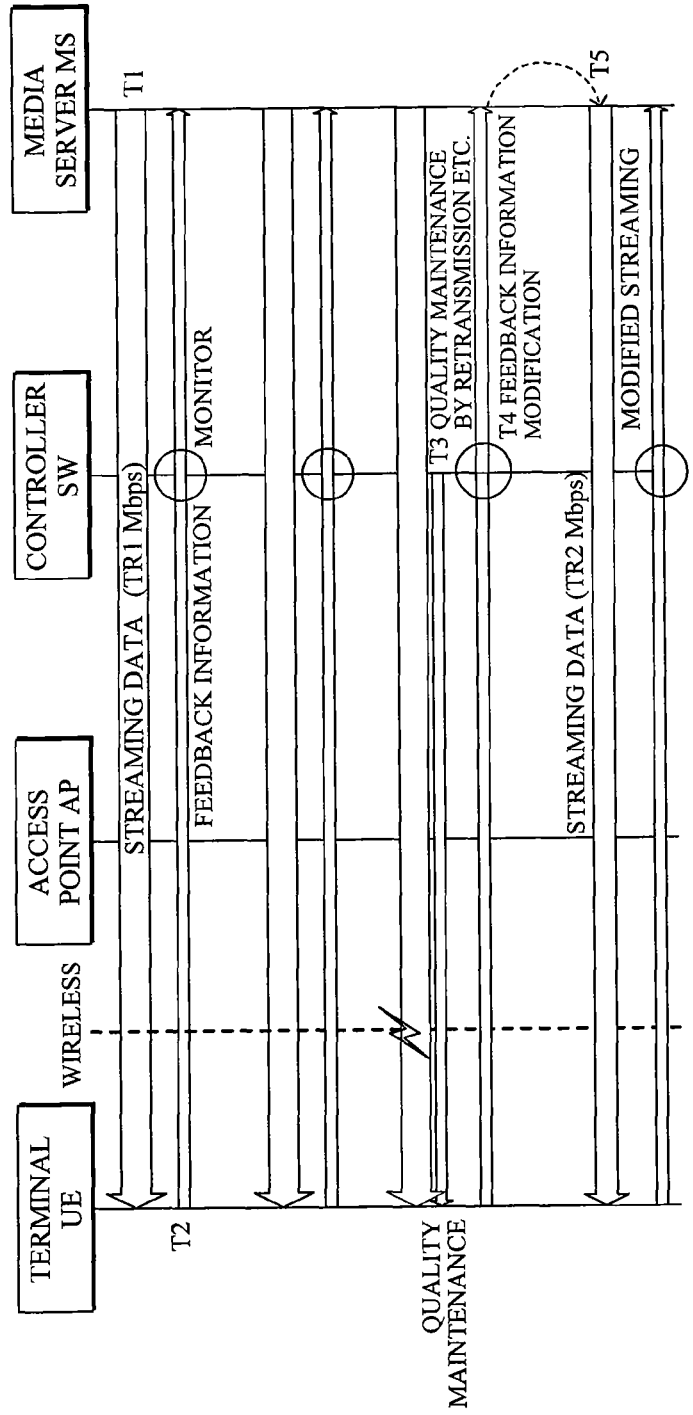
FIG. 7 is a sequence diagram depicting all operations in the network arrangement in an embodiment of the present invention.

An operation of the embodiment depicted in FIG. 4 is depicted in FIGS. 7 and 8, where in FIG. 7 a media server MS is added as the transmitting device to the system in FIG. 4. Also, the same operations as FIG. 3 are provided with the same reference numerals.

Normally in the wireless network, retransmission control, power control or redundant encoding is performed for maintaining a predetermined transmission quality when a wireless quality deterioration etc. occurs, where this sequence illustrates a quality maintenance by retransmission. In End-to-End, the feedback information is transmitted thereby to distribute data matching the current quality, where the controller SW edits the feedback information to be transferred.

At first, it is assumed that streaming data at a transmission speed TR1 [Mbps] are flowing (step T1). The terminals UE returns periodical feedback information to the media server MS (step T2), where the controller SW takes in the feedback information upon relaying.

Generally, accesses in the wireless section A are worse in transmission quality than the wire section B, so that the transmission quality maintenance, such as retransmitting packet data with errors having occurred, increasing the transmission power level or providing redundancy (enhancing) of the error correcting code, is performed by an error correction at the controller SW (step T3). The predetermined transmission quality is maintained by these operations.

The terminals UE returns the feedback information based on the transmission quality maintained to the media server MS, where the controller SW relaying this determines whether or not the feedback information should be modified depending on a degree of the transmission quality maintaining ability (error correcting ability), which will now be described in connection with FIG. 10.

Namely, the information is not modified when the resource consumed for maintaining the transmission quality is low or has a margin with respect to the transmission quality maintaining ability (limit of a consumable resource; transmission quality maintaining ability known as stored in a storing portion or notified from the access points AP). On the other hand, when the resource is high or has no margin with respect to the quality maintenance ability, by predicting that the transmission quality maintaining ability will be exceeded so that an error more than the predetermined value will occur, the feedback information is modified and a value lower than a value which the terminals UE report to the media server MS is notified to the media server MS (step T4). Without comparison with the transmission quality maintaining ability, the feedback information may be simply revised down if the resource consumed for maintaining the wireless link increases more than the predetermined value.

The media server MS in response thereto determines that a service can not be maintained with the current traffic amount (data amount), so that the information amount is converted into available traffic amount from information (packet discard rate or discarded packet number) described in the feedback information thereby to transmit the streaming data at e.g. transmission speed TR2 (TR2<TR1>)[Mbps] (step T5).

Information Generation at Quality Manager

In the controller SW depicted in FIG. 5, the transmitted packet number ($\alpha$) is notified from the transmitting portion 1_4 to the access points AP and the information of resource consumed for maintaining the wireless link performed at the access points AP from the receiving portion 1_5 is notified to the quality control manager 1_3.

For example, a number ($\beta$) having succeeded in the retransmission of the packet can be regarded as a transmission quality maintenance effect or a resource consumed. Therefore, it is also possible to report $\beta$ and $\beta/\alpha$ respectively as the discarded number and the discard rate ($\gamma$) to the feedback information modifier 1_2.

Alternatively, when the transmission power level is applied as the transmission quality maintaining ability, for example a rate of a period, for which the power level exceeds a defined value, over a predetermined time interval multiplied by a specific coefficient is supposed to be the packet discard rate ($\gamma$), thereby enabling the discarded packet number ($\beta$) to be obtained. For example, if the defined transmission power level is exceeded for 10% of the predetermined time interval, the packet discard rate assumes 1% if the specific coefficient is supposed to be 0.1 with respect to the value of 10%, so that if the transmitted packet number for the predetermined time interval is 10,000, 100 is the discarded packet number to be allocated.

Update of Information

FIGS. 8 and 9

Figure 9A:
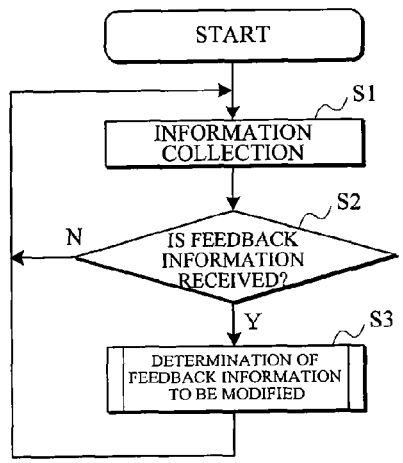
FIGS. 9A and 9B are flowcharts depicting the update timing depicted in FIG. 8.
Figure 9B:
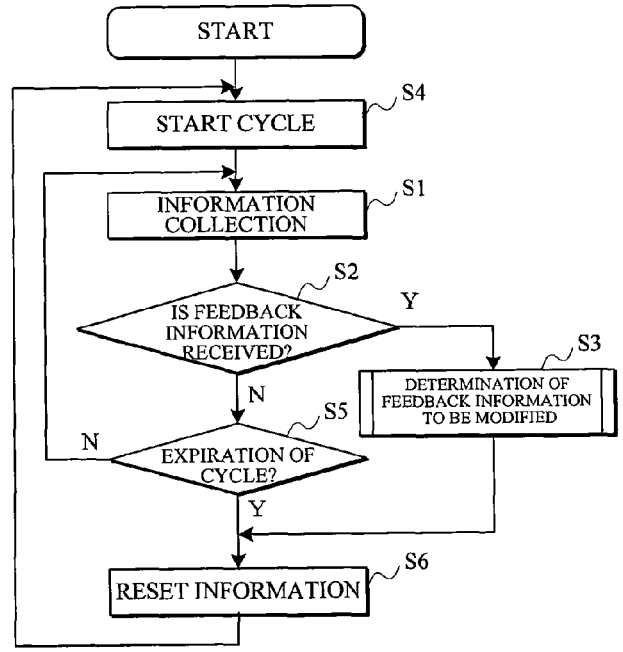

In the feedback information modifier 1_2, for subtracting a value generated by the quality manager 1_3 from a value stored in the feedback information, a fixed valid time of the value is defined. For example, as depicted in FIGS. 8A and 9A, information collection may be made during the time interval (information valid duration) in synchronization with the reception of the feedback information (step S1), or the feedback information may be modified and transmitted at the time of receiving the following feedback information (steps S2 and S3) while as depicted in FIGS. 8B and 9B a specific time interval (information valid duration) may be defined as a cycle (step S4 and S5) and with a value accumulated during the period (step S1) the feedback information may be modified and transmitted in synchronization with the reception of the following feedback information. This process may be made by the quality manager 1_3.

In any case, in this embodiment, with the reception of the feedback information at the relay device 1 being triggered, it is determined whether or not a wireless quality status for the information valid duration, e.g. a parameter such as the error correcting ability, the number of retransmission times, the power level or the like exceeds the predetermined threshold, where the feedback information is modified to a value less than a value reported from the terminals UE in excess of the predetermined threshold (step 3).

Determination of Modification of Feedback Information

FIG. 10

Figure 10:
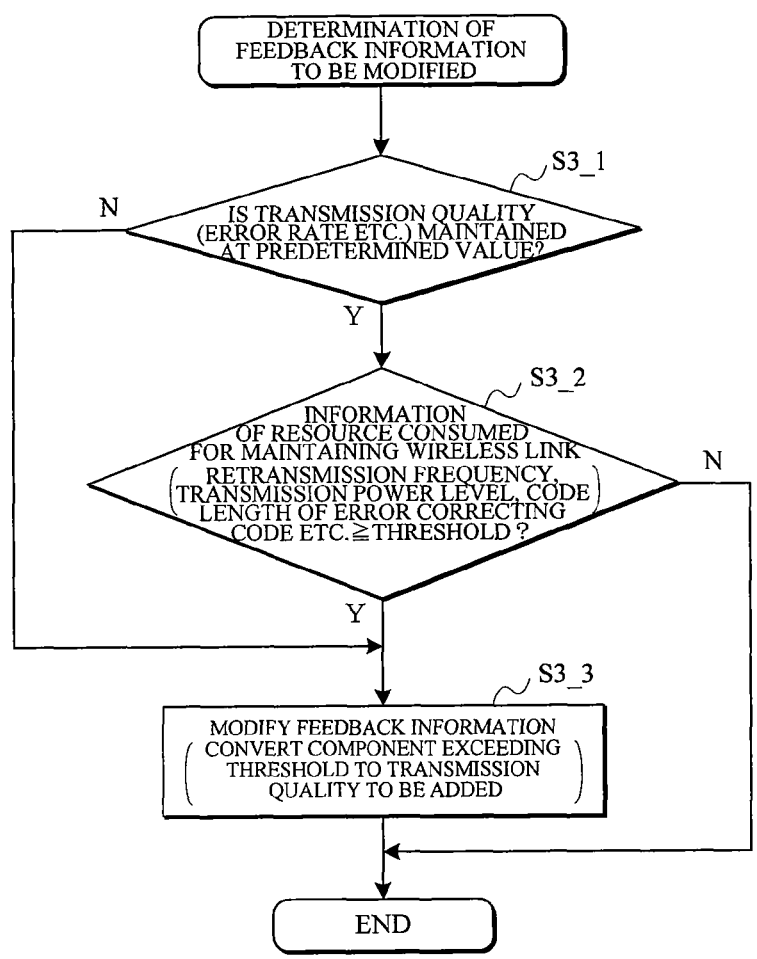
FIG. 10 is a flowchart depicting modification determination of feedback information used in the present invention.

More specific example is depicted in FIG. 10 while the contents of this step S3 have been aforementioned. In this embodiment, information necessary for modifying the feedback information is transmitted from the quality manager 1_3 to the feedback information modifier 1_2. Therefore, as depicted in FIG. 10 the feedback information modifier 1_2 will execute the following steps with the information collected (step S1):

Step S3_1:

It is determined whether or not the transmission quality is maintained, i.e. whether or not the predetermined transmission quality (e.g. error rate such as the packet discard rate or the discarded packet number) is maintained by the packet retransmission, the power control or the error correcting code level enhancement.

Step S3_2:

It is determined whether or not the information of resource exceeds the threshold (e.g. limit value), i.e. whether or not the number of packet retransmission times or the power level assumes the upper limit or whether or not the code length of the error correcting coding uses the maximum one. A value less than the limit value may be made the threshold. For example, N−1 smaller by a predetermined offset amount may be made the threshold with respect to the number of the maximum retransmission times N.

Step S3_3:

When it is determined that the transmission quality is not maintained, the feedback information is to be necessarily modified.

On the other hand, the feedback information is not modified when there is a margin for further enhancing the transmission quality maintaining ability while the transmission quality is maintained, i.e. when a power enhancement, an increase of the number of retransmission times of the packet or an intensive error correction encoding (redundancy of code) can be performed. Otherwise (step S3_3), the feedback information is to be modified.

It is also to be noted that the present invention is not limited by the above-mentioned embodiments, and it is obvious that various modifications may be made by one skilled in the art based on the recitation of the claims.

According to the embodiments, it is possible to promote the multimedia transmitting device, capable of encoding in real time and modifying the encoding rate with the feedback information from the receiving device so as to slow down the transmission speed by decreasing the encoding rate before the transmission quality maintaining ability in the wireless link reaches the limit value enabling a desired transmission quality to be maintained. As a result, upon the reproduction of the media, it is possible to avoid a rapid deterioration of picture quality or sound quality at the reproduction, caused by exceeding the limit of the transmission quality maintaining ability in the wireless link.

Furthermore, it is possible to constantly provide a remaining power enabling the transmission quality to be improved to the wireless link. Heretofore, a quality deterioration level grows in excess of a certain level of the transmission quality improvement ability in the wireless network, whereas in this embodiment a degree of variation in the transmission quality deterioration becomes moderate. This is also important for lightening the network process, whereby the remaining power saved can be used for the other processes, contributing to improve the network performance.

What is claimed is:

1. A packet relay method in a relay device, comprising:
receiving, by the relay device, feedback information from a receiving device, the feedback information including quality information indicating a transmission quality of a packet transmitted from a transmitting device to the receiving device, the quality information being used by the transmitting device for controlling a data transfer rate; and
revising down, by the relay device, the quality information included in the received feedback information to be transferred to the transmitting device based on control information, the control information indicating a degree of an increase in the transmission quality caused by a control executed by the relay device for maintaining the transmission quality, and transmitting, by the relay device, the feedback information including the revised quality information to the transmitting device;
wherein the degree of the increase in the transmission quality comprises a number of retransmission times of a packet for a predetermined period of time, and the quality information is revised down by adding a value, which is obtained by subtracting a threshold from a discarded packet number corresponding to the number of retransmission times of the packet to the receiving device, or a value, which is obtained by subtracting the threshold from a packet discard rate indicating a value obtained by dividing the discarded packet number by a number of transmission times of a packet, respectively to a discarded packet number or a packet discard rate as the transmission quality indicated by the quality information included in the received feedback information.

2. A packet relay method in a relay device, comprising:
receiving, by the relay device, feedback information from a receiving device, the feedback information including quality information indicating a transmission quality of a packet transmitted from a transmitting device to the receiving device, the quality information being used by the transmitting device for controlling a data transfer rate; and
revising down, by the relay device, the quality information included in the received feedback information to be transferred to the transmitting device based on control information, the control information indicating a degree of an increase in the transmission quality caused by a control executed by the relay device for maintaining the transmission quality, and transmitting, by the relay device, the feedback information including the revised quality information to the transmitting device;
wherein the degree of the increase in the transmission quality comprises a transmission power level for a predetermined period of time, and the quality information is revised down by adding a value, which is obtained by subtracting a threshold from a packet discard rate determined based on a ratio of a period during which the transmission power level exceeds a predetermined power level over the predetermined period of time, or a value, which is obtained by subtracting the threshold from a discarded packet number based on the packet discard rate, respectively to a packet discard rate or a discarded packet number as the transmission quality indicated by the quality information included in the received feedback information.

3. A packet relay method in a relay device, comprising:
receiving, by the relay device, feedback information from a receiving device, the feedback information including quality information indicating a transmission quality of a packet transmitted from a transmitting device to the receiving device, the quality information being used by the transmitting device for controlling a data transfer rate; and
revising down, by the relay device, the quality information included in the received feedback information to be transferred to the transmitting device based on control information, the control information indicating a degree of an increase in the transmission quality caused by a control executed by the relay device for maintaining the transmission quality, and transmitting, by the relay device, the feedback information including the revised quality information to the transmitting device;

wherein the degree of the increase in the transmission quality comprises a code length of an error correcting code for a predetermined period of time, and the quality information is revised down by adding a value, which is obtained by subtracting a threshold from a packet discard rate, or a value, which is obtained by subtracting the threshold from a discarded packet number determined based on the code length of the error correcting code is added, respectively to a packet discard rate or a discarded packet number as the transmission quality indicated by the quality information included in the received feedback information.

4. A packet relay device comprising:

a receiving portion that receives feedback information from a receiving device, the feedback information including quality information indicating a transmission quality of a packet transmitted from a transmitting device to the receiving device, the quality information being used by the transmitting device for controlling a data transfer rate; and a transmitting portion that revises down the quality information included in the received feedback information to be transferred to the transmitting device based on control information, the control information indicating a degree of an increase in the transmission quality caused by a control executed by the relay device for maintaining the transmission quality and that transmits the feedback information including the revised quality information to the transmitting device;

wherein the degree of the increase in the transmission quality includes a number of retransmission times of a packet for a predetermined period of time, and the transmitting portion revises down the quality information by adding a value, which is obtained by subtracting a threshold from a discarded packet number corresponding to the number of retransmission times of the packet to the receiving device, or a value, which is obtained by subtracting the threshold from a packet discard rate indicating a value obtained by dividing the discarded packet number by a number of transmission times of a packet, respectively to a discarded packet number or a packet discard rate as the transmission quality indicated by the quality information included in the received feedback information.

5. The packet relay device according to claim 4, wherein the packet relay device is a base station comprising a radio access node and a radio access node controller.

6. A packet relay device comprising:

a receiving portion that receives feedback information from a receiving device, the feedback information including quality information indicating a transmission quality of a packet transmitted from a transmitting device to the receiving device, the quality information being used by the transmitting device for controlling a data transfer rate; and a transmitting portion that revises down the quality information included in the received feedback information to be transferred to the transmitting device based on control information, the control information indicating a degree of an increase in the transmission quality caused by a control executed by the relay device for maintaining the transmission quality and that transmits the feedback information including the revised quality information to the transmitting device;

wherein the degree of the increase in the transmission quality includes a transmission power level for a predetermined period of time, and the transmitting portion revises down the quality information by adding a value, which is obtained by subtracting a threshold from a packet discard rate determined based on a ratio of a period during which the transmission power level exceeds a predetermined power level over the predetermined period of time, or a value, which is obtained by subtracting the threshold from a discarded packet number based on the packet discard rate, respectively to a packet discard rate or a discarded packet number as the transmission quality indicated by the quality information included in the received feedback information.

7. The packet relay device according to claim 6, wherein the packet relay device is a base station comprising a radio access node and a radio access node controller.

8. A packet relay device comprising:

a receiving portion that receives feedback information from a receiving device, the feedback information including quality information indicating a transmission quality of a packet transmitted from a transmitting device to the receiving device, the quality information being used by the transmitting device for controlling a data transfer rate; and a transmitting portion that revises down the quality information included in the received feedback information to be transferred to the transmitting device based on control information, the control information indicating a degree of an increase in the transmission quality caused by a control executed by the relay device for maintaining the transmission quality and that transmits the feedback information including the revised quality information to the transmitting device;

wherein the degree of the increase in the transmission quality includes a code length of an error correcting code for a predetermined period of time, and the transmitting portion revises down the quality information by adding a value, which is obtained by subtracting a threshold from a packet discard rate, or a value, which is obtained by subtracting the threshold from a discarded packet number determined based on the code length of the error correcting code, respectively to a packet discard rate or a discarded packet number as the transmission quality indicated by the quality information included in the received feedback information.

9. The packet relay device according to claim 8, wherein the packet relay device is a base station comprising a radio access node and a radio access node controller.

* * * * *